(12) United States Patent
Jayaram et al.

(10) Patent No.: US 9,829,001 B2
(45) Date of Patent: Nov. 28, 2017

(54) ELECTRIC SUBMERSIBLE PUMP ASSEMBLY BEARING

(71) Applicant: Summit ESP, LLC, Tulsa, OK (US)

(72) Inventors: Shiv Jayaram, Houston, TX (US); Thomas John Gottschalk, Houston, TX (US); Wesley John Nowitzki, Broken Arrow, OK (US); John Vanderstaay Kenner, Houston, TX (US)

(73) Assignee: Summit ESP, LLC, Tulsa, OK (US)

( * ) Notice: Subject to any disclaimer, the term of this patent is extended or adjusted under 35 U.S.C. 154(b) by 0 days.

(21) Appl. No.: 14/920,565

(22) Filed: Oct. 22, 2015

(65) Prior Publication Data

US 2016/0115998 A1 Apr. 28, 2016

Related U.S. Application Data

(60) Provisional application No. 62/067,796, filed on Oct. 23, 2014.

(51) Int. Cl.
*F01D 25/16* (2006.01)
*F04D 13/10* (2006.01)
(Continued)

(52) U.S. Cl.
CPC ......... *F04D 13/10* (2013.01); *F04D 29/0473* (2013.01); *F04D 29/448* (2013.01);
(Continued)

(58) Field of Classification Search
CPC ............... F04D 29/046; F04D 29/0462; F04D 29/0473; F04D 29/05; F04D 29/051;
(Continued)

(56) References Cited

U.S. PATENT DOCUMENTS 1,642,914 A 9/1927 Whann
2,236,953 A 4/1941 Schott
(Continued)

FOREIGN PATENT DOCUMENTS

CN 102606490 A 7/2012

*Primary Examiner* — Craig Kim
*Assistant Examiner* — Jason Mikus
(74) *Attorney, Agent, or Firm* — Frederic Dorwart, Lawyers PLLC; Penina Michlin Chiu

(57) ABSTRACT

An electric submersible pump (ESP) assembly bearing is described. A bearing set for an ESP assembly includes a rotatable sleeve, and a bushing outward of the rotatable sleeve, the bushing including a tubular portion, and a radial flange extending around a downstream side of the tubular portion. An ESP assembly includes a rotatable shaft, at least one stage stacked in series on the rotatable shaft, each stage including a diffuser, a stationary bearing member including a tubular portion secured within a working fluid exit of the diffuser, a stationary member flange extending radially outward from a top of the tubular portion, and a rotatable sleeve inward of the stationary bearing member and secured to the rotatable shaft. A bearing set for an ESP assembly includes a bushing including a tubular portion, and an annular retaining ring groove extending around an outer surface of the tubular portion.

26 Claims, 7 Drawing Sheets

(51) Int. Cl.
*F04D 29/047* (2006.01)
*F04D 29/44* (2006.01)
*F16C 17/14* (2006.01)

(52) U.S. Cl.
CPC ........ *F16C 17/14* (2013.01); *F05D 2250/292* (2013.01); *F05D 2260/36* (2013.01); *F16C 2360/44* (2013.01)

(58) Field of Classification Search
CPC .. F04D 29/053; F04D 29/056; F04D 29/0563; F04D 29/0566; F04D 29/057; F04D 29/059; F04D 29/041; F04D 29/0413; F04D 29/047; F04D 29/0513; F04D 1/06; F04D 1/063; F04D 13/08; F04D 13/086; F05B 2240/51; F05B 2240/52; F05B 2240/53; F05B 2240/54
USPC .......................... 415/229, 111, 112; 416/174
See application file for complete search history.

(56) References Cited

U.S. PATENT DOCUMENTS

| | | | |
|---|---|---|---|
| 3,170,646 A * | 2/1965 | Springer | F04D 3/00 241/276 |
| 3,215,083 A | 11/1965 | Sarles et al. | |
| 3,945,695 A * | 3/1976 | Speakman | F16C 33/102 384/291 |
| 3,975,117 A * | 8/1976 | Carter | F04D 1/06 415/143 |
| 4,781,531 A | 11/1988 | James | |
| 5,160,240 A * | 11/1992 | Wilson | F04D 13/10 384/425 |
| 5,209,577 A * | 5/1993 | Swatek | E21B 4/003 384/220 |
| 5,722,812 A * | 3/1998 | Knox | F04D 1/06 415/199.1 |
| 5,845,709 A | 12/1998 | Mack et al. | |
| 6,017,184 A | 1/2000 | Aguilar et al. | |
| 6,068,444 A | 5/2000 | Sheth | |
| 6,106,224 A | 8/2000 | Sheth et al. | |
| 6,167,965 B1 * | 1/2001 | Bearden | E21B 43/121 166/105.5 |
| 6,547,514 B2 | 4/2003 | Lee | |
| 6,676,366 B2 | 1/2004 | Kao | |
| 7,530,391 B2 | 5/2009 | Hall et al. | |
| 7,549,837 B2 | 6/2009 | Hackworth et al. | |
| 7,575,413 B2 * | 8/2009 | Semple | F04D 1/063 384/275 |
| 8,066,476 B2 | 11/2011 | Orban et al. | |
| 8,070,426 B2 | 12/2011 | Brunner et al. | |
| 8,287,235 B2 | 10/2012 | Orban et al. | |
| 8,400,035 B2 | 3/2013 | Watson | |
| 8,491,277 B2 | 7/2013 | Kawabata et al. | |
| 8,651,836 B2 | 2/2014 | Parmeter et al. | |
| 8,684,679 B2 * | 4/2014 | Tetzlaff | F04D 13/08 415/170.1 |
| 8,894,350 B2 * | 11/2014 | Brunner | F04D 29/041 415/107 |
| 9,039,356 B1 | 5/2015 | Nowitzki et al. | |
| 9,200,642 B2 | 12/2015 | Nowitzki et al. | |
| 9,353,752 B2 * | 5/2016 | Tetzlaff | F04D 1/04 |
| 2012/0020777 A1 | 1/2012 | Eslinger | |
| 2013/0017075 A1 | 1/2013 | Orban et al. | |
| 2013/0209225 A1 | 8/2013 | Eslinger | |
| 2014/0030055 A1 | 1/2014 | Jayaram et al. | |
| 2014/0050570 A1 | 2/2014 | Jayaram et al. | |
| 2015/0152877 A1 | 6/2015 | Jayaram et al. | |

* cited by examiner

1
ELECTRIC SUBMERSIBLE PUMP ASSEMBLY BEARING

CROSS REFERENCE TO RELATED APPLICATIONS

This application claims the benefit of U.S. Provisional Application No. 62/067,796 to Jayaram et al., filed Oct. 23, 2014 and entitled "THRUST HANDLING STAGE FOR ELECTRIC SUMBERSIBLE PUMP ASSEMBLIES," which is hereby incorporated by reference in its entirety.

BACKGROUND OF THE INVENTION

1. Field of the Invention

Embodiments of the invention described herein pertain to the field of electric submersible pump assemblies. More particularly, but not by way of limitation, one or more embodiments of the invention enable an electric submersible pump assembly bearing.

2. Description of the Related Art

Fluid, such as gas, oil or water, is often located in underground formations. In such situations, the fluid must be pumped to the surface so that it can be collected, separated, refined, distributed and/or sold. Centrifugal pumps are typically used in electric submersible pump (ESP) applications for lifting well fluid to the surface. Centrifugal pumps impart energy to a fluid by accelerating the fluid through a rotating impeller paired with a stationary diffuser. A rotating shaft runs through the central hub of the impeller and diffuser. A motor upstream of the pump turns the shaft, and the impeller is keyed to the shaft, causing the impeller to rotate with the shaft.

Each rotating impeller and stationary diffuser pair is called a "stage". The impeller's rotation confers angular momentum to the fluid passing through the pump. The angular momentum converts kinetic energy into pressure, thereby raising the pressure on the fluid and lifting it to the surface. Multiple stages of impeller and diffuser pairs may be used to further increase the pressure lift. The stages are stacked in series around the pump's shaft, with each successive impeller sitting on a diffuser of the previous stage.

A conventional ESP assembly includes, from upstream to downstream, a motor, seal section, intake section, and multistage centrifugal pump. Production tubing carries the pumped fluid from the centrifugal pump to the well's surface. The assembly components each have a shaft running longitudinally through their centers that are connected and rotated by the motor. In gassy wells, a gas separator or charge pump may also be included in the assembly. For example, a gas separator may act as the intake of the assembly. In such instances, the gas separator compresses the gaseous fluid and then attempts to separate any unsaturated gas before the fluid passes into the centrifugal pump. Gas separators sometimes include impeller and diffuser stages to increase the pressure of the fluid during compression and separation of gases. Similarly, charge pumps are also sometimes used in tandem with a primary centrifugal pump in gassy wells, and may also employ stages.

During operation, whether in a pump, charge pump or gas separator, pump assembly stages are subject to axial forces in the upward and downward directions, conventionally referred to as "thrust." Downward force or "downthrust" is a result of a portion of the impeller discharge pressure acting on the top of the impeller. Upward force or "upthrust" is a result of a portion of the impeller discharge pressure acting against the bottom of the impeller. A second upward force is the force produced by the momentum of the fluid making its turn in the impeller passageway. Pump assembly stages are also subject to radial forces that can cause the shaft to become misaligned.

To carry the thrust of the pump, thrust bearings are sometimes employed in pump stages. The thrust bearings include a bushing that is pressed into the wall of the diffuser. A sleeve is keyed to the shaft inward of the stationary bushing. A thin layer of fluid forms in between the sleeve and bushing of the bearing set to provide fluid film lubrication and carry the downthrust loads. The sleeve may further act as a radial support bearing.

Stationary bushings are traditionally disk-like in shape or shaped like a hollowed cylinder. A conventional stationary bushing is illustrated in FIG. 1. The conventional bushing must remain stationary as the sleeve rotates, and as such, these bushings must be securely pressed into the inner wall of the diffuser exit. To make room for the bushing, the diffuser core is bored to remove material from the wall of the diffuser exit, and in doing so, the area of the diffuser exit normal to absolute flow velocity is reduced. Reducing the area of the diffuser exit reduces the performance of the stage by diminishing the ability of the stage to increase the pressure of the fluid passing through the pump assembly.

Typically, the reduced performance caused by insertion of the bushing is combatted by increasing the number of pump stages, which adds cost to the pump assembly. In addition, the bushing is conventionally made of a hard material like tungsten carbide, which is expensive and so the bushing itself adds to the overall cost of the pump assembly.

As is apparent from the above, current ESP bearings suffer from many shortcomings. Therefore, there is a need for an improved electric submersible pump assembly bearing.

BRIEF SUMMARY OF THE INVENTION

One or more embodiments of the invention enable an electric submersible pump (ESP) assembly bearing.

An ESP assembly bearing is described. An illustrative embodiment of a bearing set for an electric submersible pump (ESP) assembly includes a rotatable sleeve, and a bushing outward of the rotatable sleeve, the bushing including a tubular portion, and a radial flange extending around a downstream side of the tubular portion. In some embodiments, an outer diameter of the flange is tapered inwards in a downstream direction. In certain embodiments, the rotatable sleeve is a flanged sleeve. In some embodiments, the bushing is secured to a portion of a diffuser defining a diffuser exit. In certain embodiments, the rotatable sleeve includes a rotating member flange, and the radial flange of the bushing extends between the rotating member flange and the portion of the diffuser defining a diffuser exit.

An illustrative embodiment of an electric submersible pump (ESP) assembly includes a rotatable shaft, at least one stage stacked on the rotatable shaft, each of the at least one stage including a diffuser, a stationary bearing member including a tubular portion secured within a working fluid exit of the diffuser, a stationary member flange extending radially outward from a top of the tubular portion, and a rotatable bearing member comprising a sleeve, the sleeve inward of the bearing member and secured to the rotatable shaft. In some embodiments, the rotatable bearing member includes a rotating member flange extending radially outward from a top of the sleeve, wherein the stationary member flange extends between the rotating member flange and the diffuser. In certain embodiments, an outer diameter of the stationary member flange is tapered inward in a downstream direction. In some embodiments, the stationary member flange and the tubular portion each comprise at least one channel that together define a pathway for working fluid. In certain embodiments, the at least one stage is located in one of a centrifugal pump, gas separator, charge pump or combination thereof. In some embodiments, the ESP assembly further includes a retaining ring secured around an upstream side of the tubular portion, wherein the retaining ring is adjacent to a bottom of a hub of the diffuser.

An illustrative embodiment of a bearing set for an electric submersible pump (ESP) assembly includes a bushing including an annular portion extending longitudinally between a rotatable sleeve and a portion of a diffuser defining a diffuser exit, the annular portion including an annulus inner diameter and an annulus outer diameter, the annulus outer diameter pressed into an inner diameter of the portion defining the diffuser exit, a flange extending radially outward from a top of the annular portion, the flange comprising an upper surface and a lower surface, and the lower surface of the flange and the annulus outer diameter defining an indentation in the bushing, and wherein the inner diameter of the portion defining the diffuser exit interlockedly fits within the indentation. In some embodiments, an outer edge of the flange extending between the upper surface and the lower surface is tapered. In certain embodiments, the taper is inwards in a downstream direction. In some embodiments, the annulus inner diameter and the flange upper surface each have at least one channel and the at least one channel forms a pathway for working fluid. In some embodiments, the rotatable sleeve comprises a sleeve flange, and the flange of the bushing extends between the sleeve flange and the portion defining the diffuser exit. In some embodiments, the annular portion has a retaining ring groove around the annular portion.

An illustrative embodiment of a bearing set for an electric submersible pump (ESP) assembly includes a rotatable sleeve, and a bushing outward of the rotatable sleeve, the bushing including a tubular portion, and an annular retaining ring groove extending around an outer surface of the tubular portion. In some embodiments, the bearing set further includes a radial flange extending around an upstream side of the tubular portion, and the annular retaining ring groove is proximate to a downstream side of the tubular portion. In some embodiments, the bushing is secured to a portion of a diffuser defining a diffuser exit. In certain embodiments, the bearing set further includes a radial flange extending around an upstream side of the tubular portion, and wherein the radial flange of the bushing is upstream of a hub of the diffuser and positioned adjacent to the hub. In some embodiments, the rotatable sleeve is keyed to a shaft of one of a centrifugal pump or gas separator. In some embodiments, the bearing set further includes a retaining ring positioned in the annular retaining ring groove.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

Figure 1:
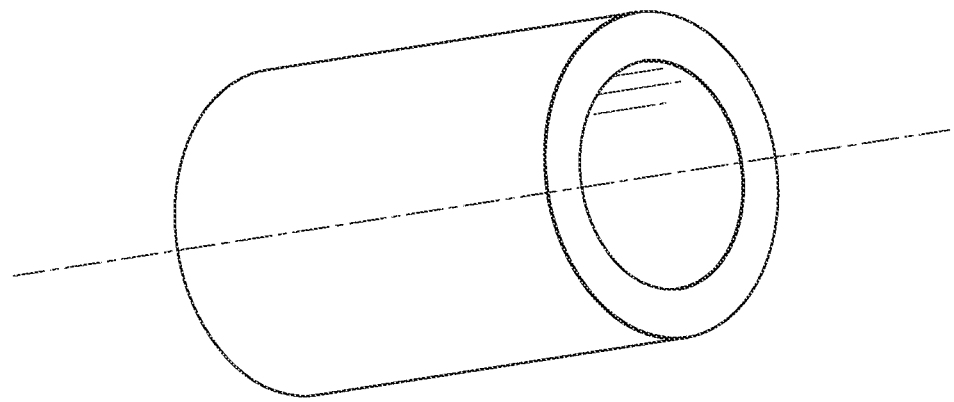
FIG. 1 is a bushing of the prior art.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

An electric submersible pump (ESP) assembly bearing will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a stage includes one or more stages.

"Coupled" refers to either a direct connection or an indirect connection (e.g., at least one intervening connection) between one or more objects or components. The phrase "directly attached" means a direct connection between objects or components.

As used herein, the term "outer," "outside" or "outward" means the radial direction away from the center of the shaft of the ESP and/or the opening of a component through which the shaft would extend. As used herein, the term "inner", "inside" or "inward" means the radial direction toward the center of the shaft of the ESP and/or the opening of a component through which the shaft would extend.

As used herein the terms "axial", "axially", "longitudinal" and "longitudinally" refer interchangeably to the direction extending along the length of the shaft of an ESP assembly component such as a multi-stage centrifugal pump, gas separator or charge pump.

"Downstream" refers to the direction substantially with the principal flow of working fluid when the pump assembly is in operation. By way of example but not limitation, in a vertical downhole electric submersible pump (ESP) assembly, the downstream direction may be towards the surface of the well.

"Upstream" refers to the direction substantially opposite the principal flow of working fluid when the pump assembly is in operation. By way of example but not limitation, in a vertical downhole ESP assembly, the upstream direction may be opposite the surface of the well.

As used herein, the term "top" with respect to an ESP assembly component refers to the downstream-most side of the component. The term "bottom" means the upstream-most side of the component.

One or more embodiments provide a bearing for ESP assemblies. While illustrative embodiments are described in terms of an oil and/or gas downhole pumping embodiment, nothing herein is intended to limit the invention to that embodiment. Illustrative embodiments may be equally applicable to mixed flow or radial flow stages.

An illustrative embodiment of a stationary member of a thrust and/or radial bearing set includes a flange that extends radially from the annulus of the stationary member. In one example, the bushing flange may be sandwiched between a flange of the rotating member and the diffuser exit and/or pressed into the diffuser exit. In another example, the bushing flange may be on an upstream side of the bushing, below the diffuser hub. The annular portion of the stationary member may have a reduced thickness as compared to conventional bushings, with the diffuser exit taking up the space that would otherwise be filled with bushing material. Illustrative embodiments therefore may allow for more area of diffuser exit and less bushing material, while still providing an equivalent surface area of contact between the rotating and stationary members, as compared to conventional stages employing thrust bearings. These features may allow between a 5% and 10% increase in stage performance, including an increased pressure lift from each stage, which may allow for fewer stages to be incorporated into the overall ESP assembly. In one example, a one-hundred-forty stage conventional ESP assembly may be reduced by between seven and fourteen stages when implementing illustrative embodiments, which may reduce the cost of the assembly by about 5%. Further, a stationary member with a smaller footprint may reduce the cost of the bushing by reducing the cost of the bushing material. Illustrative embodiments may be employed in centrifugal pump stages, gas separator stages and/or charge pump stages.

The stationary member of illustrative embodiments may include channels for the handling of abrasive-laden well fluid. In some embodiments, the flange of the stationary member may include a radial channel on its upper surface and the tubular portion may include an axial channel on its inner diameter (inner surface), which radial and axial channels may intersect. The stationary member flange of illustrative embodiments may have a tapered outer edge so that working fluid may exit smoothly to match the flow velocity in the impeller eye.

The stationary member may include a retention ring groove. A retaining ring placed in the groove may keep the stationary member from becoming unseated during operation. The retaining ring groove may be located on the side of the stationary member that is opposite the flange of the stationary member.

Figure 2:
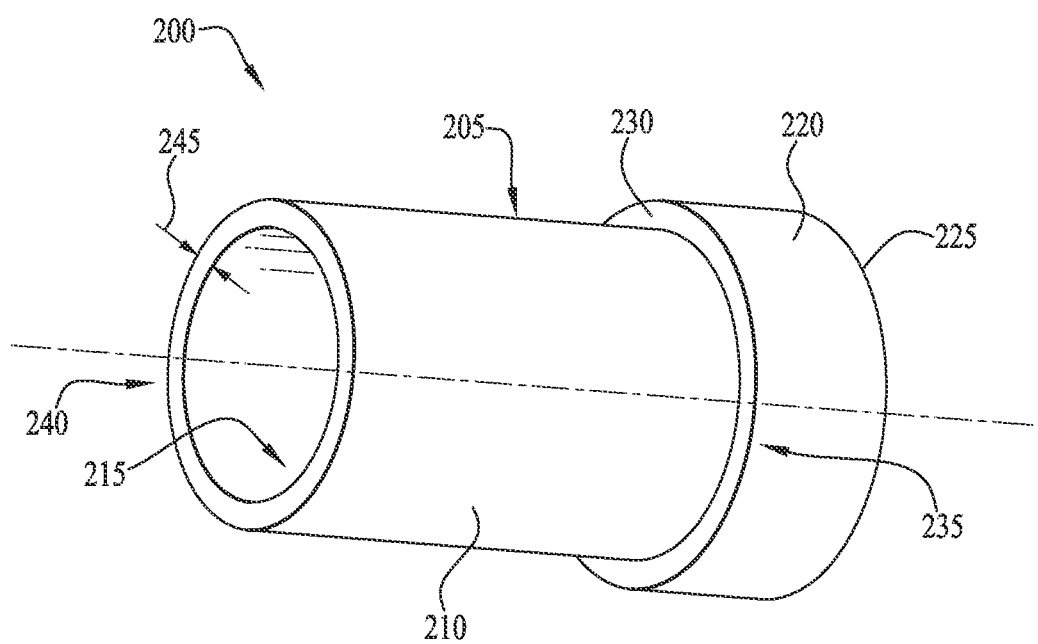
FIG. 2 is a perspective view of a stationary member of a bearing set of an illustrative embodiment.

Illustrative embodiments include a stationary member of a bearing set. FIG. 2 illustrates an exemplary stationary member of illustrative embodiments. As shown in FIG. 2, bushing 200 includes tubular portion 205 and bushing flange 220. Tubular portion 205 may be tubular and/or annular in shape, and bushing flange 220 may extend radially from and/or around an end or side of tubular portion 205. As illustrated in FIG. 2, bushing flange 220 extends around top 235 of tubular portion 205. In some embodiments, bushing flange 220 may extend around bottom 240 of tubular portion 205. Bushing 200 may be made of a hard material such as tungsten carbide, silicon carbide, or another material having similar properties. The thickness 245 of tubular portion 205 may be reduced as compared to the wall thickness of conventional stationary bushings in a comparable location of a comparable pump assembly. For example, the thickness 245 of tubular portion 205 may be reduced from 0.188 inches to about 0.120 inches. In such instances, the material needed to form bushing 200 may be reduced by about 63% by volume.

Figure 5:
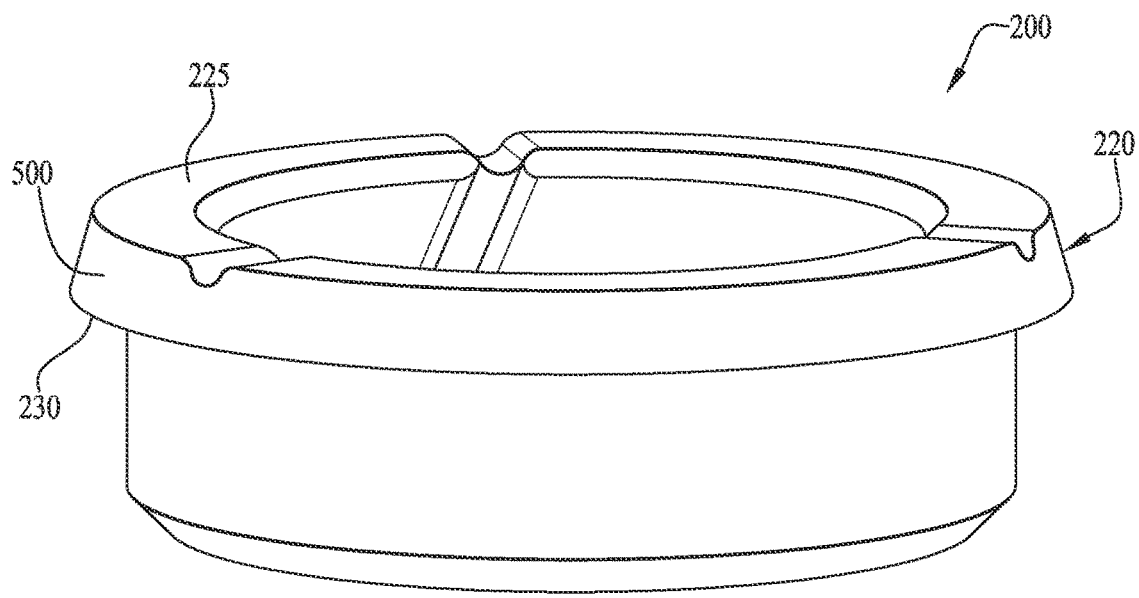
FIG. 5 is a perspective view of a stationary member of an illustrative embodiment having a tapered flange.
Figure 9:
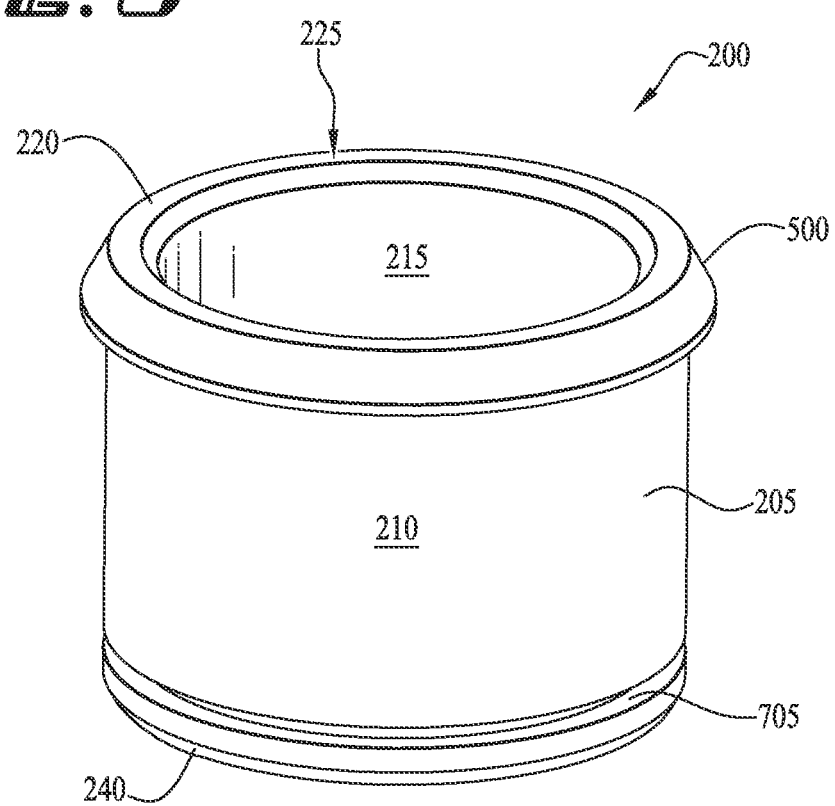
FIG. 9 is a perspective view of a stationary member of a bearing set of an illustrative embodiment.

Tubular portion 205 may be annular and/or tubular in shape (forming a hollow cavity) and have an inner diameter 215 forming the inner surface of tubular portion 205 and an outer diameter 210 forming the outer surface of tubular portion 205. As shown in FIG. 2, bushing flange 220 may be located on top 235 of tubular portion 205. Bushing flange 220 may extend radially from tubular portion 205, and may include an upper surface 225 and a bottom surface 230. In some embodiments, no flange may be present on bottom 240 of tubular portion 205. As shown in FIG. 5 and FIG. 9, outer edge 500 of bushing flange 220 may extend from bottom surface 230 to upper surface 225. Outer edge 500 of bushing flange 220 may be tapered, such that it slants inward in a downstream direction and/or as judged from bottom surface 230. Tapering outer edge 500 of bushing flange 220 may cause fluid flow to exit smoothly to match the flow velocity in the impeller eye (not shown).

Figure 3:
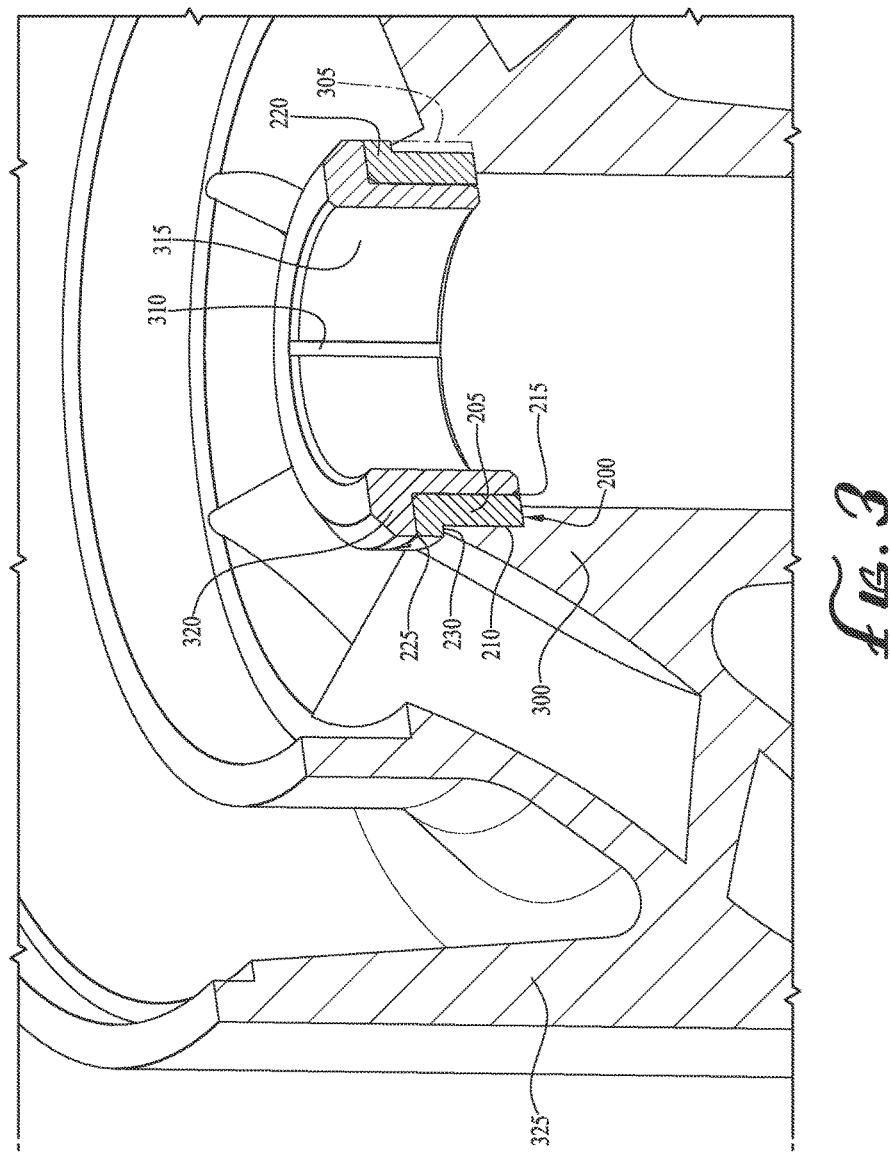
FIG. 3 is a cross sectional view of a diffuser and bearing set of an illustrative embodiment.

Referring to FIG. 3, bushing 200 may be pressed in with interference fit and/or secured to an inner wall of a diffuser, in between the portion of the diffuser forming diffuser exit 300, and sleeve 315 of the bearing set. An interference fit may provide about two-thousandths of an inch of squeeze. FIG. 3 illustrates bushing 200 pressed into diffuser exit 300 of diffuser 325, and situated and/or sandwiched between diffuser exit 300 and rotatable sleeve 315. As shown in FIG. 3, rotatable sleeve 315 may be paired with bushing 200 to form a thrust and/or radial bearing set. Sleeve 315 may be keyed at keyway 310 to the shaft 610 (shown in FIG. 6) of the ESP assembly component, such as a centrifugal pump shaft, gas separator shaft and/or charge pump shaft, such that sleeve 315 rotates with shaft 610 during operation of the ESP assembly. Diffuser 325 and bushing 200 should not substantially rotate during operations (remain stationary).

As shown in FIG. 3, outer diameter 210 and bottom surface 230 may form an indentation 305 in stationary bushing 200. Diffuser exit 300 and bushing 200 may be fixedly pressed into each other such that diffuser exit 300 fills indentation 305, interlockedly occupying the space formed by indentation 305 that would conventionally be filled with additional bushing material. The additional diffuser exit 300 material filling indentation 305 may be diffuser exit volume that need not be bored away to make room for bushing 200, as would conventionally need to be done.

Figure 7:
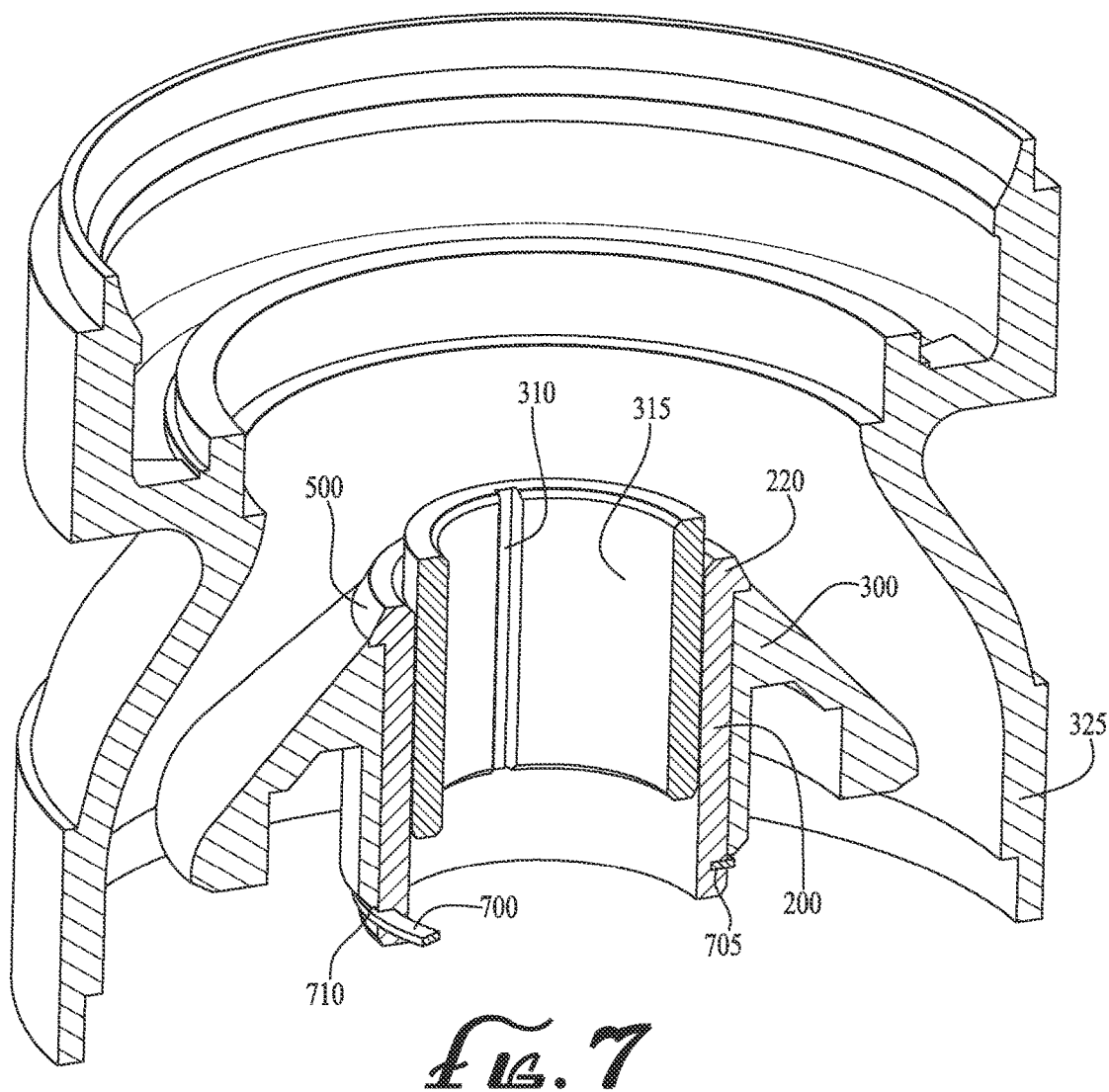
FIG. 7 is a cross sectional view of a diffuser with a bearing set of an illustrative embodiment.
Figure 8:
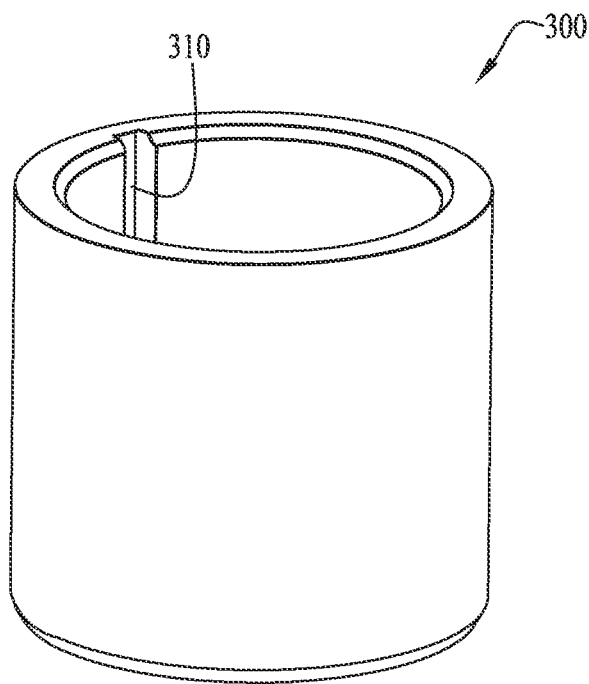
FIG. 8 is a perspective view of a rotatable member of a bearing set of an illustrative embodiment.

In some embodiments, both sleeve 315 and bushing 220 may be flanged. As illustrated in FIG. 3, sleeve flange 320 of sleeve 315 may rest over and/or be adjacent to upper surface 225 of bushing flange 220. During operation of the ESP assembly, as sleeve 315 rotates, pumped fluid may flow between inner diameter 215 of tubular portion 205 and sleeve 315, and also flow between upper surface 225 of bushing flange 220 and sleeve flange 320. This fluid lubrication may provide radial and hydraulic thrust support to the pump assembly. In certain embodiments, sleeve 315 may not include a flange. FIG. 7 shows an illustrative embodiment of a bearing set having bushing 200 with bushing flange 220, and sleeve 315 that is flangeless. In embodiments where sleeve 315 is flangeless, working fluid may flow between the inner diameter 215 (shown in FIG. 3) of bushing 200 and the outer diameter of sleeve 315 providing only radial support in the pump. FIG. 8 illustrates a sleeve of illustrative embodiments without flange. FIG. 9 illustrates bushing 200 with bushing flange 220 of an illustrative embodiment that may be employed in a stage with a flangeless sleeve, such as sleeve 310 illustrated in FIG. 8. Where sleeve 315 is flangeless, sleeve 315 may be taller longitudinally than bushing 200, as shown in FIG. 7.

As illustrated in FIG. 7 and FIG. 9, bushing 200 may include retaining ring groove 705 near the bottom side of tubular portion 205. Although bushing 200 may be secured by interference fit, at high temperatures, such as above about 300° F., bushing 200 may work its way out and/or become unseated from diffuser 325. If the ESP assembly is running in upthrust, for example in a situation where the actual flow rate is lower than the best flow rate, placement of retaining ring 700 in retaining ring groove 705, as shown in FIG. 7, may prevent bushing 200 from slipping upwards. Retaining ring groove 705 may be machined or molded into tubular portion 205. Retaining ring 700 may be clipped and/or secured into retaining ring groove 705. Retaining ring 700 may be steel, a nickel and copper alloy, or another hard, corrosion resistant material. As shown in FIG. 7, should bushing 200 experience upward forces (downstream direction), retaining ring 705 may press up against diffuser hub 710, preventing upward motion of bushing 200. Bushing flange 220 shown in FIG. 7, may prevent bushing from moving downward (upstream direction) when the ESP assembly runs in downthrust.

Figure 4:
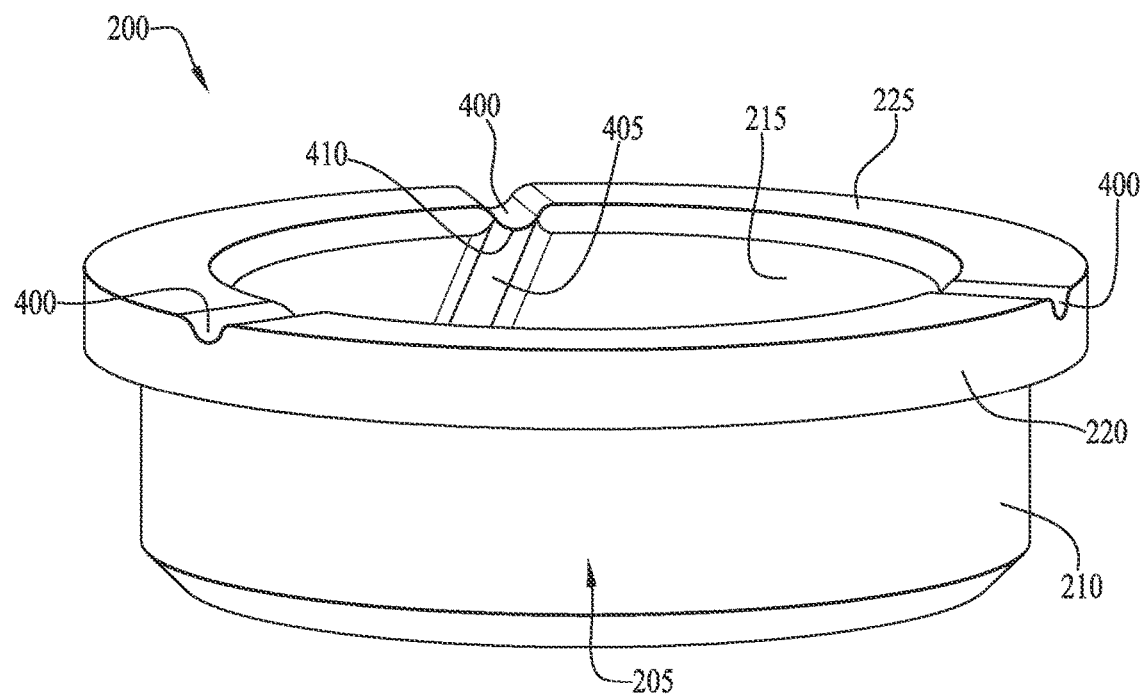
FIG. 4 is a perspective view of a channeled stationary member of an illustrative embodiment.

Pumped fluid may contain abrasives such as sand, dirt, rocks and other solid particles found underneath the ground. In such embodiments, bushing 200 may include channels to assist in guiding the flow of fluid around the bushing 200 surfaces to reduce abrasive wear and to cool the surface of bushing 200. FIG. 4 illustrates an exemplary embodiment of a channeled bushing 200. As shown in FIG. 4, bushing 200 includes an axial channel 405 extending along the inner diameter 215 of tubular portion 205. Axial channel 405 is shown slanted along the axial surface at about 30° from the vertical, but vertical axial channels and slants at other angels are also contemplated. Also as shown in FIG. 4, bushing flange 220 includes radial channel 400 extending radially along upper surface 225. Axial channel 405 and radial channel 400 may intersect at intersection 410. Pumped fluid may be guided through radial channel 400, axial channel 405 and intersection 410. Additional channels may also be included on stationary bushing 200 and/or sleeve 315.

Figure 10:
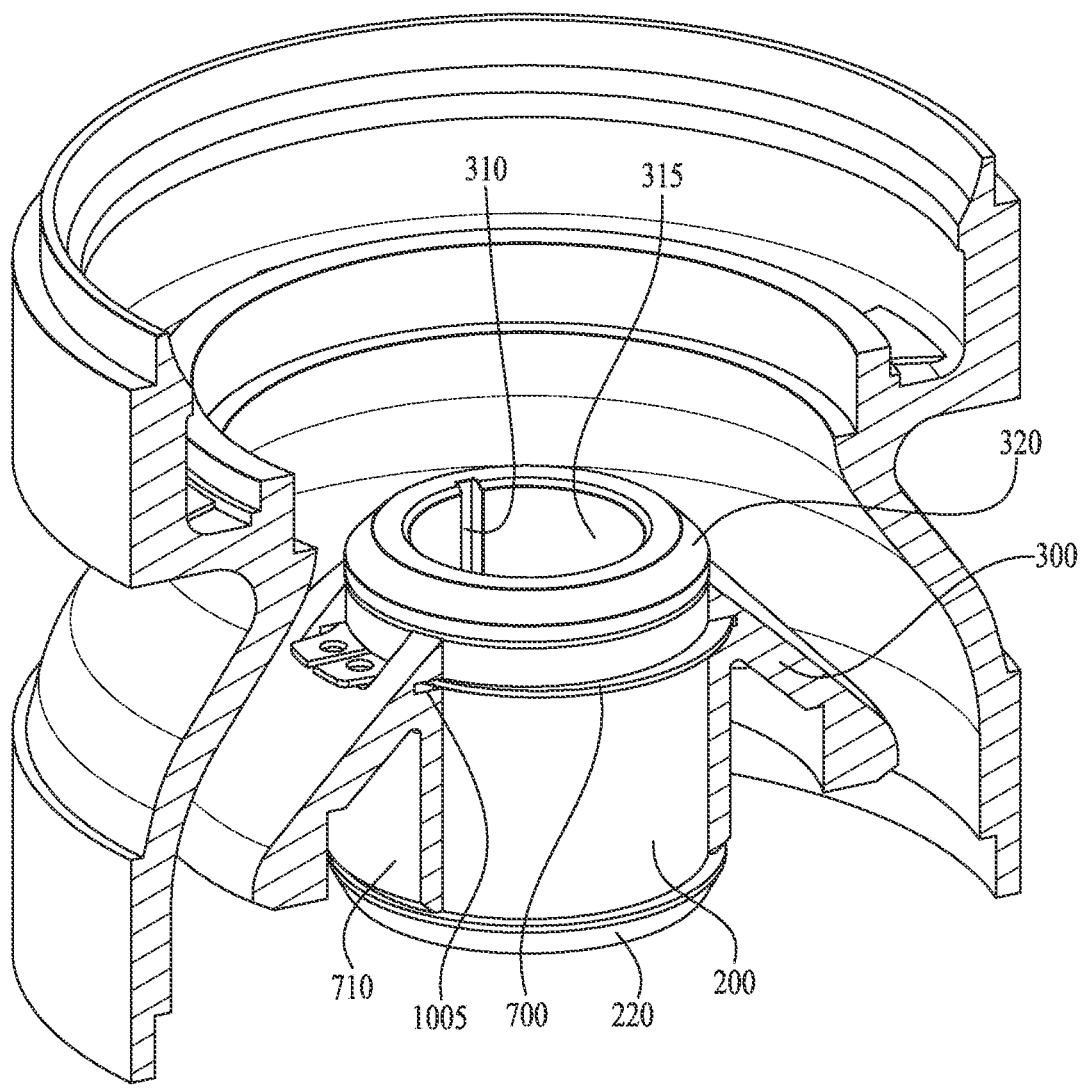
FIG. 10 is a cross sectional view of a diffuser and bearing set of an illustrative embodiment.

In some embodiments, bushing 200 may be inverted such that bushing flange 220 extends from bottom 240 of tubular portion 205, rather than top 235. An exemplary inverted bushing of an illustrative embodiment is shown in FIG. 10. As illustrated in FIG. 10, bushing flange 220 extends around the upstream side and/or bottom 240 of tubular portion 205 of bushing 200. Bushing flange 220 may be adjacent to and/or press up against diffuser hub 710. Retaining ring 700 may be secured into retaining ring groove 705 near top 235 of tubular portion 205. Slot 1005 in the portion defining diffuser exit 300 may be milled or cast, for example, and accommodate retaining ring 700. When bushing 200 has bushing flange 220 on its upstream side as illustrated in FIG. 10, bushing flange 220 may prevent unseating of bushing 200 if the ESP assembly is running in upthrust. In embodiments where bushing 200 is inverted, outer edge 500 (shown in FIG. 5) may be tapered outward in a downstream direction. In certain embodiments making use of retaining ring 700, bushing flange 220 may be eliminated and bushing 200 shortened to recess inside diffuser hub 710.

Figure 6:
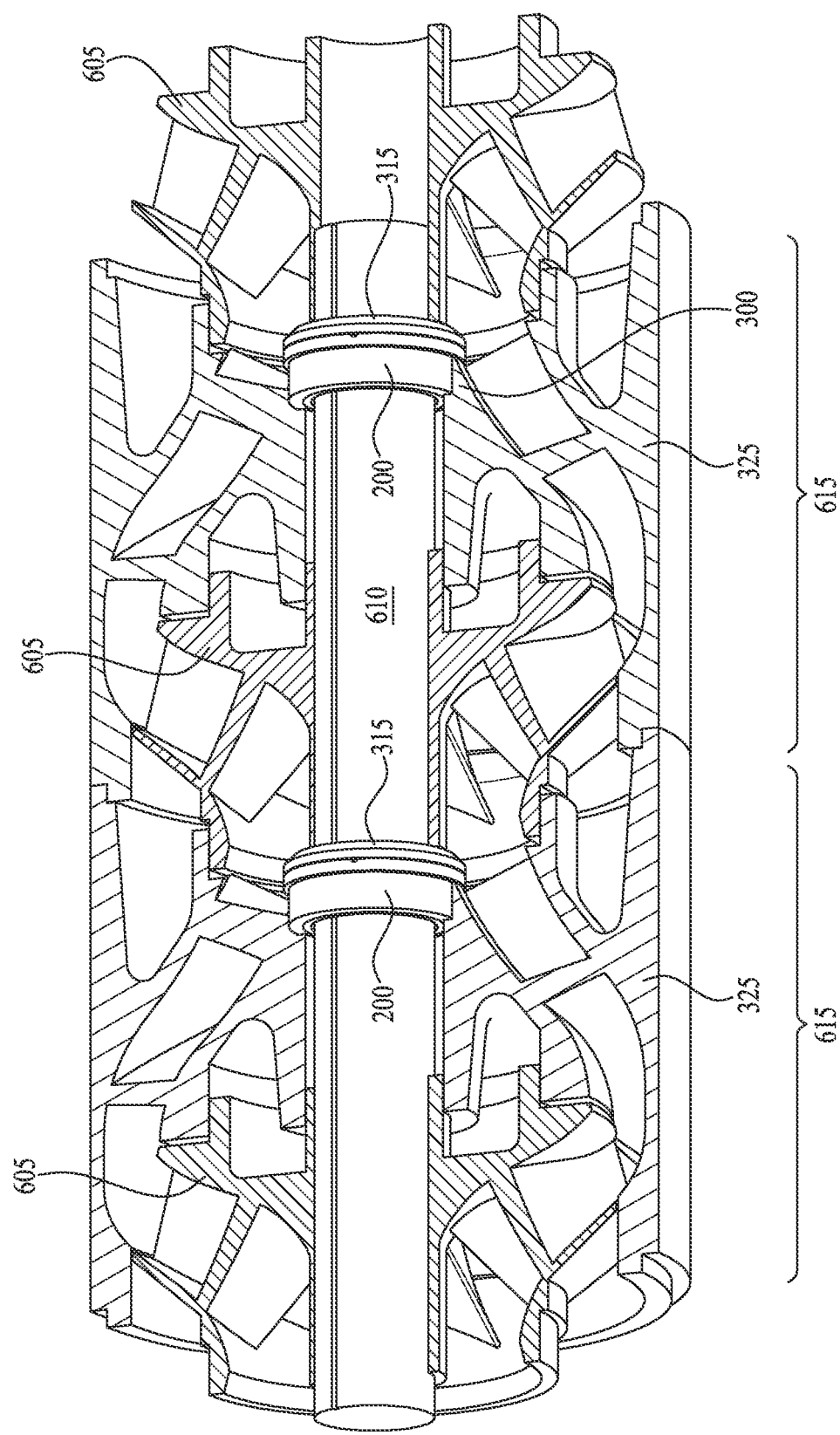
FIG. 6 is a cross-sectional view of two impeller and diffuser stages of an illustrative embodiment stacked in series.

FIG. 6 illustrates exemplary impeller and diffuser stages incorporating a bushing of an illustrative embodiment. As shown in FIG. 6, diffusers 325 may be paired with impellers 605. Each impeller 605 may be inward of a diffuser 325 and keyed to shaft 610 to form stage 615, such that impeller 605 rotates with shaft 610 during operation of the ESP assembly. The stages 615 of FIG. 6 may be stages of a centrifugal pump, stages of a charge pump or stages of a gas separator of an ESP assembly. A single stage or multiple stages 615 may be stacked in series about shaft 610. For example, in an exemplary charge pump a single stage may be employed, in a gas separator one to five stages may be employed; in a multi-stage centrifugal pump fifty stages or one-hundred-twenty stages, for example, may be employed. Sleeve 315 may be keyed to shaft 610 such that sleeve 315 rotates with shaft 610. Bushing 200 may be pressed into the wall of diffuser exit 300, remaining stationary as shaft 610 and sleeve 315 rotate. Stationary bushing 200 may extend circumferentially about sleeve 315 such that there is a tight clearance between the inner diameter 215 of stationary bushing 200 and the outer diameter of sleeve 315, and in some embodiments, between upper surface 225 of bushing 200 and sleeve flange 320. Pumped fluid may pass through the tight clearances, providing thrust and/or radial support to the stages 615. As illustrated in FIG. 3, as a result of the shape of the stationary bushing 200 of illustrative embodiments, including indentation 305, the area of diffuser exit 300 normal to absolute flow velocity may be increased in illustrative embodiments as compared to conventional stages.

An ESP assembly bearing has been described. Illustrative embodiments may provide for an impeller and diffuser stage that may be better capable of increasing fluid pressure whilst carrying thrust from an ESP centrifugal pump assembly and/or providing radial support. The diffuser exit of illustrative embodiments may include additional area normal to absolute flow velocity that improves the performance of each stage, such that fewer stages may be employed. The stationary bushing of illustrative embodiments has a smaller footprint and therefore takes up less space in the diffuser exit, whilst still performing its thrust carrying and/or radial support function at a reduced cost.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. A bearing set for an electric submersible pump (ESP) assembly comprising:
   a rotatable sleeve; and
   a bushing outward of the rotatable sleeve press fit to a diffuser, the bushing comprising:
   a tubular portion having an outer diameter; and
   a thrust carrying flange extending radially around a top end of the tubular portion, the flange comprising an outer edge positioned radially outward from the outer diameter of the tubular portion;
   the tubular portion having a retaining ring groove around an upstream side of the outer diameter of the tubular portion;
   a retaining ring seated in the retaining ring groove; and
   the retaining ring positioned adjacently below a diffuser hub.

2. The bearing set of claim 1, wherein the outer edge of the thrust carrying flange is tapered inwards in a downstream direction.

3. The bearing set of claim 1, wherein the rotatable sleeve is a flanged sleeve.

4. The bearing set of claim 1, wherein the bushing is press fit to a portion of the diffuser defining a diffuser exit.

5. The bearing set of claim 4, wherein the rotatable sleeve comprises a rotating member flange, and wherein the thrust carrying flange of the bushing extends between the rotating member flange and the portion of the diffuser defining the diffuser exit.

6. The bearing set of claim 5, wherein the rotatable sleeve is keyed to an ESP shaft.

7. An electric submersible pump (ESP) assembly comprising:
   a rotatable shaft;
   at least one stage stacked on the rotatable shaft, each of the at least one stage comprising:
   a diffuser;
   a stationary bearing member comprising:
   a tubular portion pressed into a working fluid exit of the diffuser;
   a thrust carrying flange extending radially outward around a top end of the tubular portion, the flange comprising an outer edge position radially outward from an outer surface of the tubular portion; and
   a retaining ring secured around an upstream side of the outer diameter of the tubular portion, wherein the retaining ring is adjacent to a bottom of a hub of the diffuser; and
   a rotatable bearing member comprising a sleeve, the sleeve inward of the stationary bearing member and secured to the rotatable shaft.

8. The ESP assembly of claim 7, wherein the rotatable bearing member comprises a rotating member flange extending radially outward from a top of the sleeve, wherein the thrust carrying flange extends between the rotating member flange and the diffuser.

9. The ESP assembly of claim 7, wherein the outer edge of the thrust carrying flange is tapered inward in a downstream direction.

10. The ESP assembly of claim 7, wherein the thrust carrying flange and the tubular portion each comprise at least one channel that together define a pathway for working fluid.

11. The ESP assembly of claim 7, wherein the at least one stage is located in a centrifugal pump.

12. The ESP assembly of claim 7, wherein the at least one stage is located in one of a gas separator, charge pump or a combination thereof.

13. A bearing set for an electric submersible pump (ESP) assembly comprising:
   a bushing comprising:
   an annular portion extending longitudinally between a rotatable sleeve and a portion of a diffuser defining a diffuser exit, the annular portion comprising an annulus inner diameter and an annulus outer diameter, the annulus outer diameter pressed into an inner diameter of the portion defining the diffuser exit;
   a thrust carrying flange extending radially outward around a top of the annular portion, the flange comprising an upper surface and a lower surface, the upper surface and the lower surface joined by a flange outer edge positioned radially outward from the annular portion; and
   the lower surface of the flange and the annulus outer diameter defining an indentation in the bushing; and
   wherein the inner diameter of the portion defining the diffuser exit interlockedly fits within the indentation.

14. The bearing set of claim 13, wherein the thrust carrying flange outer edge is tapered.

15. The bearing set of claim 14, wherein the taper is inwards in a downstream direction.

16. The bearing set of claim 13, wherein the annulus inner diameter and the thrust carrying flange upper surface each have at least one channel.

17. The bearing set of claim 16, wherein the at least one channel forms a pathway for working fluid.

18. The bearing set of claim 13, wherein the rotatable sleeve comprises a sleeve flange, and the thrust carrying flange of the bushing extends between the sleeve flange and the portion defining the diffuser exit.

19. The bearing set of claim 13, wherein the bushing is located in one of an ESP pump, gas separator or charge pump.

20. The bearing set of claim 13, wherein the annular portion has a retaining ring groove around the annular portion.

21. The bearing set of claim 20, further comprising a retaining ring secured within the retaining ring groove.

22. A bearing set for an electric submersible pump (ESP) assembly comprising:
   a rotatable sleeve; and
   a bushing outward of the rotatable sleeve, the bushing pressed into a portion of a diffuser
   defining a diffuser exit, the bushing comprising:
   a tubular portion;
   an annular retaining ring groove extending around an outer surface of the tubular portion; and
   a thrust carrying flange extending radially around an upstream end of the tubular portion, the thrust carrying flange comprising an outer edge positioned radially outwards from the tubular portion, and wherein the thrust carrying flange of the bushing is upstream of a hub of the diffuser and positioned adjacent to the hub.

23. The bearing set of claim 22, wherein the annular retaining ring groove is proximate to a downstream side of the tubular portion.

24. The bearing set of claim 22, wherein the rotatable sleeve is a flanged sleeve.

25. The bearing set of claim 22, wherein the rotatable sleeve is keyed to a shaft of one of a centrifugal pump or gas separator.

26. The bearing set of claim 22, further comprising a retaining ring positioned in the annular retaining ring groove.

* * * * *